United States Patent
Lim

(10) Patent No.: US 10,266,032 B2
(45) Date of Patent: Apr. 23, 2019

(54) STRUCTURE FOR MOUNTING WING KNOB FOR VEHICLE AIR VENT

(71) Applicant: NIFCO KOREA INC., Cheonan-si, Chungcheongnam-do (KR)

(72) Inventor: Yang Mook Lim, Cheonan-si (KR)

(73) Assignee: NIFCO KOREA INC., Cheonan-si, Chungcheongnam-do (KR)

( * ) Notice: Subject to any disclaimer, the term of this patent is extended or adjusted under 35 U.S.C. 154(b) by 315 days.

(21) Appl. No.: 15/102,090

(22) PCT Filed: Dec. 5, 2014

(86) PCT No.: PCT/KR2014/011916
§ 371 (c)(1),
(2) Date: Jun. 6, 2016

(87) PCT Pub. No.: WO2015/084100
PCT Pub. Date: Jun. 11, 2015

(65) Prior Publication Data
US 2016/0303942 A1    Oct. 20, 2016

(30) Foreign Application Priority Data

Dec. 6, 2013 (KR) .......................... 10-2013-0151734

(51) Int. Cl.
*B60H 1/00* (2006.01)
*B60H 1/34* (2006.01)

(52) U.S. Cl.
CPC .......... *B60H 1/0065* (2013.01); *B60H 1/3421* (2013.01); *B60H 2001/3471* (2013.01); *B60H 2001/3492* (2013.01)

(58) Field of Classification Search
CPC ................ B60H 1/0065; B60H 1/3421; B60H 2001/3471; B60H 2001/3492
(Continued)

(56) References Cited

U.S. PATENT DOCUMENTS 5,364,303 A * 11/1994 Terry ..................... B60H 1/345
  454/155
6,497,616 B2 * 12/2002 Yamaguchi .......... B60H 1/3428
  454/155

(Continued)

FOREIGN PATENT DOCUMENTS

JP    2009-113632 A    5/2009
JP    2009-115434 A    5/2009
(Continued)

OTHER PUBLICATIONS

Europe Patent Office, "Search Report for European Patent Application No. 14866948.4," dated Jul. 19, 2017.
PCT International Search Report of PCT/KR2014/011916.

*Primary Examiner* — Gregory L Huson
*Assistant Examiner* — Frances F. Hamilton
(74) *Attorney, Agent, or Firm* — Manabu Kanesaka

(57) ABSTRACT

A structure for mounting a wing knob for a vehicle air vent includes a plurality of vanes, an upper knob and a lower knob encompassing one of the vanes, a rubber member for reducing friction noise between the upper and lower knobs, and a decoration member coupled between the upper and lower knobs to add decorative esthetic sense. The upper knob has a holding piece at a lower portion of an opening of the upper knob. The rubber member has a stepped shoulder portion. The decoration member has a fitting groove. The lower knob is integrally provided with a hook to be held by the holding piece, a holding projection held by the shoulder portion, and a hook piece fitted into the fitting groove of the decoration member.

4 Claims, 3 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 7,162,773 | B2* | 1/2007 | Song | B60H 1/3414 16/110.1 |
| 9,073,407 | B2* | 7/2015 | Kober | B60H 1/3414 |
| 9,758,018 | B2* | 9/2017 | Schlippe | B60H 1/24 |
| 2006/0014485 | A1* | 1/2006 | Sousa | B60H 1/3421 454/315 |
| 2007/0111653 | A1* | 5/2007 | Endou | B60H 1/3421 454/155 |
| 2008/0119124 | A1* | 5/2008 | Okuno | B60H 1/3428 454/69 |
| 2009/0286462 | A1* | 11/2009 | Goto | B60H 1/3428 454/155 |
| 2011/0319005 | A1 | 12/2011 | Sawada et al. | |
| 2016/0313025 | A1* | 10/2016 | Nemoto | F24F 13/06 |

FOREIGN PATENT DOCUMENTS

| | | |
|---|---|---|
| JP | 2010-115972 A | 5/2010 |
| JP | 3176607 U | 6/2012 |
| JP | 2015-014385 A | 1/2015 |
| KR | 10-0833164 B1 | 5/2008 |
| KR | 20-2010-0004896 U | 5/2010 |
| WO | 2013/018385 A1 | 2/2013 |

* cited by examiner

_US 10,266,032 B2_

STRUCTURE FOR MOUNTING WING KNOB FOR VEHICLE AIR VENT

CROSS-REFERENCES TO RELATED APPLICATIONS

The present application is National Phase of International Application No. PCT/KR2014/011916 filed Dec. 5, 2014, and claims priority from Korean Application No. KR 10-2013-0151734 filed Dec. 6, 2013, the disclosure of which is incorporated herein.

TECHNICAL FIELD

The present invention relates to a structure for mounting a wing knob for a vehicle air vent, wherein the knob is prevented from being detached from vanes when the knob is carelessly pulled or applied with a shock in use.

BACKGROUND ART

In general, cold air or warm air is discharged to the inside of a vehicle through air vents provided to a dashboard for cooling or heating a vehicle room.

Such an air vent includes a plurality of horizontal wings provided to the front end portion of a housing and freely rotatable in the vertical direction so as to control an air discharge direction upwards or downwards, and a plurality of vertical wings provided at the rear portion of the horizontal wings and freely rotatable so as to control the air discharge direction to the left or right, wherein the vertical wings also can block the supply of the discharge air.

In the air vent of a vehicle as above, the horizontal wings are connected to each other through a link so as to operate in association, and the vertical wings are also connected to each other through a link so as to operate in association, wherein the supply of discharge air also can be blocked by sealing discharge holes with the plurality of horizontal wings.

Further, a wing knob is provided to the vane so as to control the wind direction of the air vent.

FIG. 1 and FIG. 3 of the present application show the structure of such a prior art wing knob.

That is, a knob rear part 1 has an opening provided in a forward direction so as to be coupled with a knob front part 2 in a state, in which a vane 3 is received in an open groove portion in the forward direction thereof. Also, the knob rear part 1 is coupled with a decoration member 4 for providing decorative esthetic sense at the rear portion thereof.

At this time, a knob rubber member 5 is interposed between the knob rear part 1 and the vane 3. The knob rear part 1 is provided with a hook 8 at the front portion thereof so as to be held by the knob front part 2 and prevented from being detached therefrom, as shown in FIG. 2 of the present application.

Further, the decoration member 4 is integrally provided with a holding protrusion 6 inwardly and the knob rear part 1 is integrally provided with a holding projection 7 such that the holding protrusion 6 is held by the holding projection 7 and prevented from being detached therefrom, as shown in FIG. 3.

PRIOR ART DOCUMENT

Patent Document

[Patent Document 1]: Korean Utility Model Publication No. 20-0452765

DISCLOSURE OF INVENTION

Technical Problem

Meanwhile, according to the prior art wing knob structure, the knob rear part 1 and the knob front part 2 as well as the decoration member 4 are all likely to be detached.

That is, detachment force is typically applied in a direction from the vane 3 to the decoration member 4, wherein the direction that the knob rear part 1 and knob front part 2 are coupled to each other by the hook 8 coincides with the direction that the detachment force is applied.

In addition, the decoration member 4 also maintains the attachment thereof in a state, in which the direction that the holding protrusion 6 coupled to the knob rear part 1 is coupled to the holding projection 7 coincides with the direction that the detachment force is applied. Therefore, if the coupling force of the hook 8 or the coupling force between the holding protrusion 6 and the holding projection 7 becomes weak, each part becomes likely to be detached even when a small shock or force is applied, thereby causing problems in quality such as the detachment of the wing knob.

If the wing knob is detached, the wind direction conversion which is one of the main functions of the air vent becomes impossible, resulting in the consumer complaints.

The present invention is derived in consideration of the above disadvantages and any other problems, and has an objective to provide a structure for mounting a wing knob for a vehicle air vent, wherein each part is coupled to be locked in a direction perpendicular to the direction that a shock or force is applied, thereby preventing the detachment of each part in advance.

The present invention has another objective to provide a structure for mounting a wing knob for a vehicle air vent, which can prevent the failure of the wind direction conversion of the air vent due to the detachment of the knob which is the troublesome problem of the air vent.

Solution to Problem

In order to achieve the above and any other objectives of the present invention, according to the present invention, there is provided a structure for mounting a wing knob for a vehicle air vent, which includes a plurality of vanes 10 arranged at predetermined intervals for controlling the wind direction of an air vent, upper knobs 20 and lower knobs 30 respectively provided for encompassing the vanes 10 at upper and lower portions thereof so as to control the angles of the vanes 10, rubber members 40 in contact with the vanes 10 to reduce friction noise in a state, in which the rubber members 40 are received between the upper knobs 20 and the lower knobs 30, and decoration members 50 are coupled between the upper knobs 20 and the lower knobs 30 in a state, in which the upper knobs 20 and the lower knobs 30 are assembled as single bodies, so as to add decorative esthetic sense, characterized in that:

the upper knob 20 has holding pieces 22 formed at the lower portion of an opening 21 provided at one side of the upper knob 20;

the rubber member 40 has a shoulder portion 41 formed to be stepped;

the decoration member 50 has fitting grooves 51; and the lower knob 30 is integrally provided with each of a hook 31 to be held by the holding pieces 22 in a state, in which the lower knob 30 is moved forwards through the opening 21, a holding projection 32 held by the shoulder portion 41 of the rubber member 40, and hook pieces 33 fitted into the fitting grooves 51 of the decoration member 50 and held therein.

Further, it is preferable that the vane 10 is formed with a groove portion 11 and the upper knob 20 has a fitting projection 25 to be fitted into the groove portion 11 of the vane 10 such that the vane 10 and the upper knob 20 are maintained in a perfect coupling state while being assembled.

Advantageous Effects of Invention

According to the present invention in the above configuration, the upper knob 20, the lower knob 30 and the decoration member 50 are coupled to be respectively locked in a direction perpendicular to a direction that a shock or force is applied, such that each of the parts can be prevented from being detached.

Therefore, the failure of the wind direction conversion of the air vent due to the detachment of the knob, which is the troublesome problem of the air vent, can be prevented, thereby improving the marketability and reliability.

MODE FOR THE INVENTION

Hereinafter, a wing knob of an air vent according to a preferred embodiment of the present invention will now be described with respect to the configuration in detail with reference to the accompanied drawings.

Figure 1:
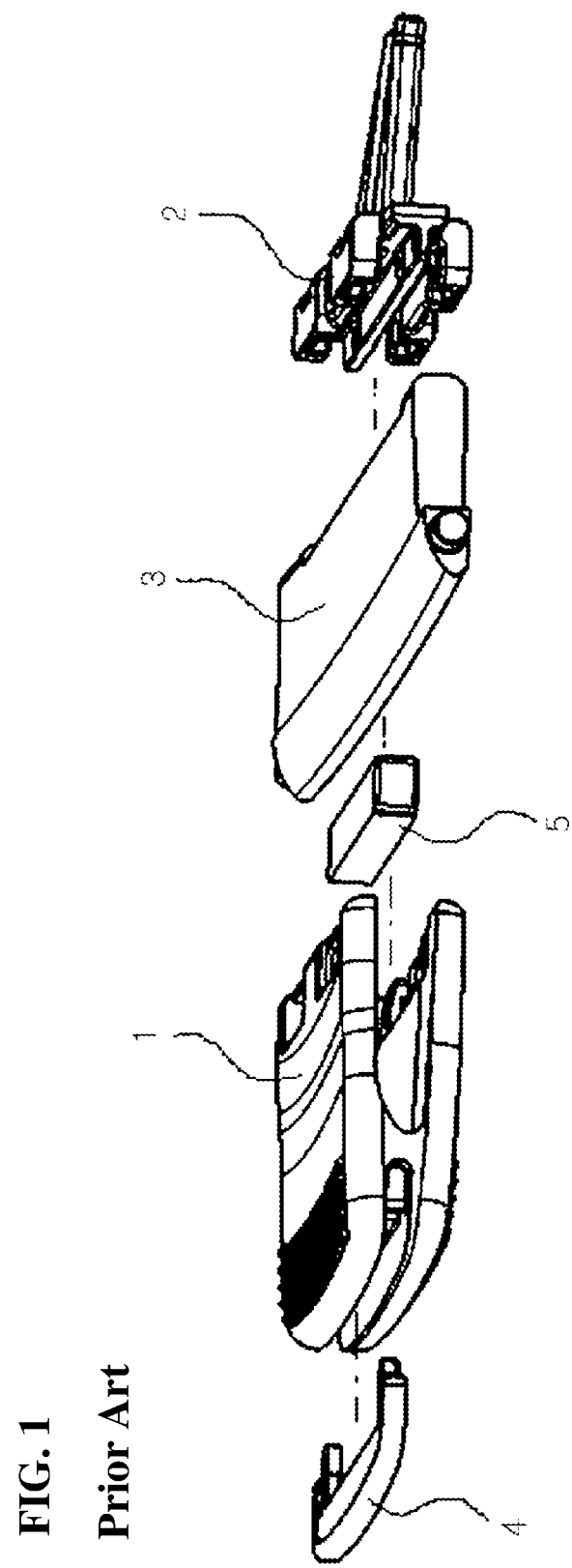
FIG. 1 is a disassembled perspective view showing the configuration of a prior art wing knob.
Figure 2:
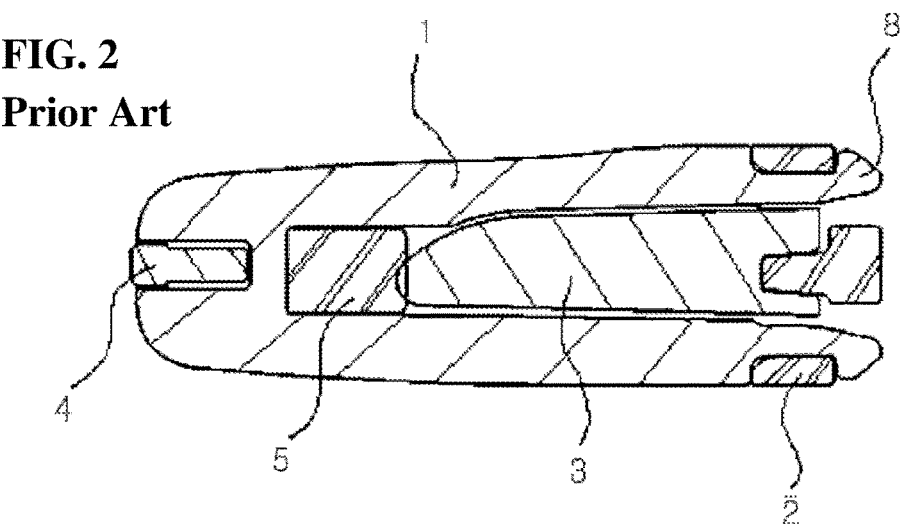
FIG. 2 is a longitudinal sectional view showing the assembled state of FIG. 1.
Figure 3:
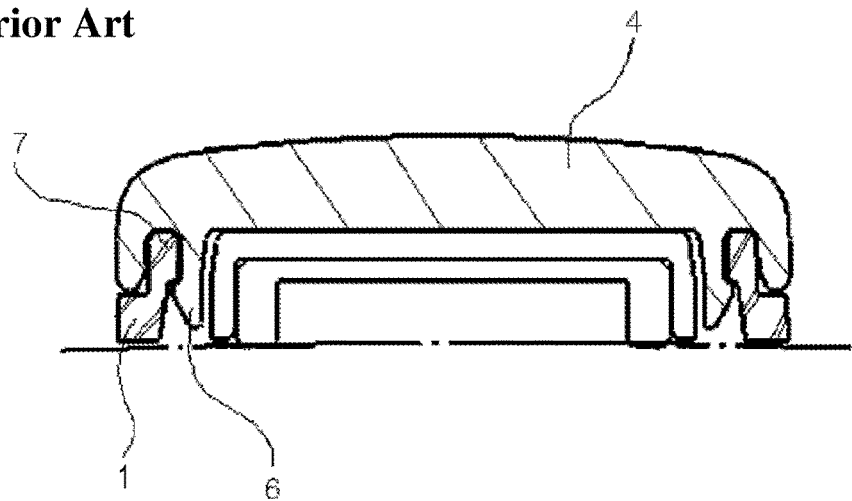
FIG. 3 is a cross sectional view showing the assembled state of FIG. 1.
Figure 4:
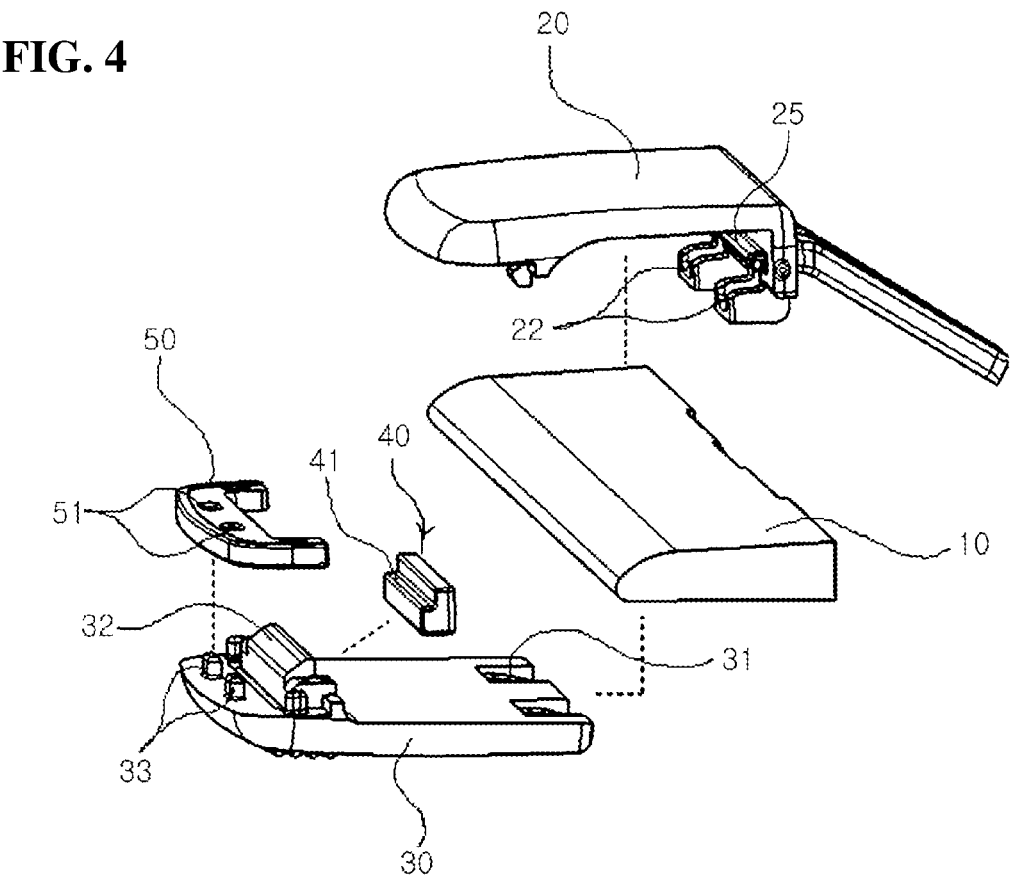
FIG. 4 is a disassembled perspective view showing the configuration of a wing knob according to the present invention.

FIG. 4 is a disassembled perspective view showing the configuration of a wing knob according to the present invention, wherein an upper knob 20 and a lower knob 30 are divided in the vertical direction and assembled with each other in a state, in which a vane 10, a rubber member 40 and a decoration member 50 are positioned between the upper knob 10 and the lower knob 30.

Figure 5:
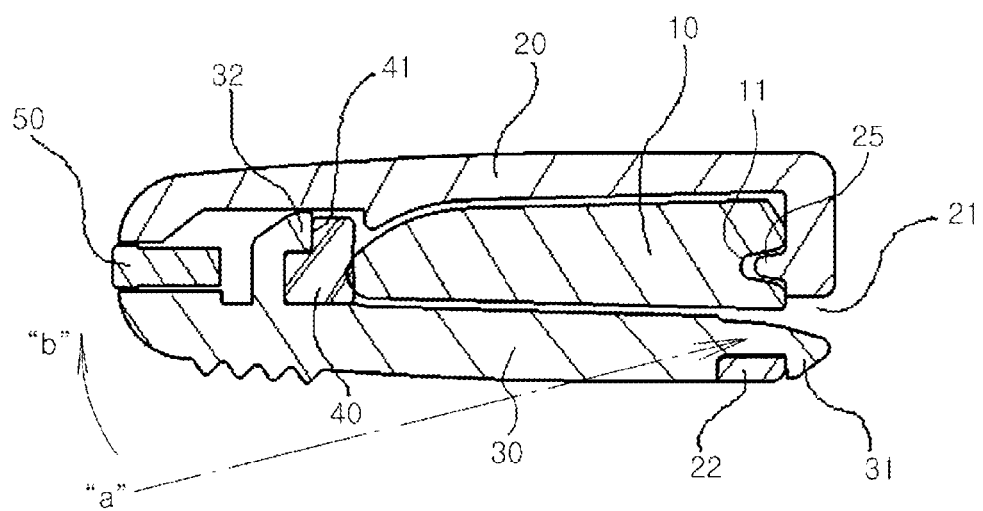
FIG. 5 is a longitudinal sectional view showing the assembled state of FIG. 4.

FIG. 5 is a longitudinal sectional view showing the assembled state of each part.

A plurality of vanes 10 for controlling the wind direction of the air vent is arranged at predetermined intervals and wing knobs are coupled thereto so as to control the direction of the vanes 10.

The wing knob includes the upper knob 20 and the lower knob 30 which are assembled with each other as a single body, the rubber member 40 and the decoration member 50.

The upper knob 20 and the lower knob 30 are formed in a shape, in which the upper knob 20 and the lower knob 30 are divided in the vertical direction and respectively provided at the upper and lower portions of the vane 10 so as to encompass the vane 10.

The rubber member 40 is inserted into an internal portion defined by the upper knob 20 and the lower knob 30, which are made from synthetic resin materials, and is in contact with the end surface of the vane 10 in the insertion state, thereby improving the touch and reducing the friction noise when operating the wing knob.

The decoration member 50 is provided between the upper knob 20 and the lower knob 30 in a state, in which the upper knob 20 and the lower knob 30 are assembled with each other as a single body, wherein the outside end portion of the decoration member 50 is exposed to the outside so as to provide decorative esthetic sense.

In some cases, the parts of the wing knob structured as above are possibly detached in the lengthwise direction of the vane 10, that is, towards the decoration member 50 when a shock or operation force is applied thereto in a state, in which the wing knob is mounted on the vane 10.

The present invention is to prevent the generation of such a case in advance, wherein a coupling part is formed to be perpendicular to the lengthwise direction of the vane 10, that is, the detachment direction of the decoration member 50.

That is, the upper knob 20 has holding pieces 22 formed at the lower portion of an opening 21 which is open at one side.

The holding pieces 22 are injection-molded at two positions spaced from each other as shown in FIG. 4.

The rubber member 40 has a shoulder portion 41 which is formed to be stepped in an approximate "L" shape as shown in FIG. 5.

The decoration member 50 has fitting grooves formed at two positions spaced from each other at a predetermined interval.

Meanwhile, the lower knob 30 is integrally formed with a hook 31 such that the hook 31 is held by the holding pieces 22 in a state, in which the lower knob 30 is moved forwards through the opening 21. Further, the lower knob 30 has a holding projection 32 formed to be folded upwards at an assembling position for the rubber member 40 so as to be held by the shoulder portion 41.

Furthermore, the lower knob 30 is integrally formed with hook pieces 33 at positions corresponding to the fitting grooves 51 of the decoration member 50 such that the hook pieces 33 are fitted into the fitting grooves 51 and then held by the fitting grooves 51.

In the wing knob according to the present invention as above, the vane 10, the rubber member 40 and the decoration member 50 are positioned between the upper knob 20 and the lower knob 30 and then the hook 31 is moved forward through the opening 21 in a state, in which the lower knob 30 is slightly inclined in the direction of arrow "a" in FIG. 5.

In sequence, the lower knob 30 is slightly pulled in the direction of arrow "b" in FIG. 5 (in the decoration member direction) and then slightly lifted and moved forwards.

Then, the hook 31 is held by the holding pieces of the upper knob 20 and the holding projection 32 of the lower knob 30 is held by the shoulder portion 41 of the rubber member 40.

Further, the hook pieces 33 of the lower knob 30 are fitted into the fitting grooves 51 of the decoration member 50 so as to be held by the fitting grooves 51 of the decoration member 50.

At this time, the holding projection 32 of the lower knob 30 can be held by the shoulder portion 41 of the rubber member 40 by the elastic force of the rubber member 40 which is made from a soft rubber material.

Therefore, the hook 31 and the hook pieces 33 are held at positions perpendicular to the detachment direction, that is, the exposure direction of the decoration member 50, such that the parts are prevented from being detached even if a shock or force is applied in the detachment direction.

Meanwhile, it is preferable that the vane 10 is provided with a groove portion 11 and the upper knob 20 is provided with a fitting protrusion 25 so as to be fitted into the groove portion 11 such that the vane 10 and the upper knob 20 are maintained in a perfect coupling state as being assembled with each other.

INDUSTRIAL APPLICABILITY

The present invention is applied to the technique relating to the wing knob provided to an air vent. In particular, the present invention is applied to a technique for improving the quality of the wing knob so as to prevent the detachment of the wing knob while a user operates the same.

The embodiments described above are to be understood as a few illustrative examples of the present invention and the present invention is not limited to the embodiments and the drawings. It will be understood by those skilled in the art that various modifications, combinations and changes may be made to the embodiments without departing from the scope of the present invention.

BRIEF EXPLANATION OF REFERENCE SYMBOLS

10 Vanes 20 Upper knob
21 Opening 22 Holding pieces
30 Lower knob 31 Hook
32 Holding projection 33 Hook pieces
40 Rubber member 41 Shoulder portion
50 Decoration member 51 Fitting grooves

The invention claimed is:

1. A structure for mounting a wing knob for a vehicle air vent comprising:
    a plurality of vanes arranged at a predetermined interval for controlling a wind direction of the air vent,
    an upper knob and a lower knob provided to encompass one of the vanes at upper and lower portions thereof so as to control an angle of the vane,
    a rubber member received between the upper knob and the lower knob, and contacting the vane for reducing friction noise, and
    a decoration member coupled between the upper knob and the lower knob in a state, in which the upper knob and the lower knob are assembled as a single body, so as to add decorative esthetic sense,
    wherein the upper knob has
        a holding piece having an opening therein, and
        another holding piece laterally spaced from the holding piece and having another opening therein,
        the holding piece and another holding piece extending downwardly from the upper knob and formed at lower portions of the opening and another opening, respectively, provided at one side of the upper knob;
    the rubber member has a shoulder portion having a stepped part;
    the decoration member has a fitting groove; and
    the lower knob is integrally provided with a holding projection having a stepped part, a hook to be held by the holding piece and another hook to be held by the another holding piece in a state, in which the lower knob is moved forward through the opening and the another opening to engage the upper and lower knobs, the stepped part of the holding projection held by the stepped part of the shoulder portion of the rubber member, and a hook piece fitted into the fitting groove of the decoration member and held therein.

2. A structure for mounting a wing knob for a vehicle air vent according to claim 1, wherein the vane is formed with a groove portion and the upper knob has a fitting projection to be fitted into the groove portion of the vane such that a mutual coupling state is maintained.

3. A structure for mounting a wing knob for a vehicle air vent according to claim 2, wherein the fitting projection is formed between a lower surface of the upper knob and the holding piece.

4. A structure for mounting a wing knob for a vehicle air vent according to claim 2, wherein the fitting projection is extending over the holding piece and the another holding piece.

* * * * *